United States Patent
Williamson et al.

(10) Patent No.: US 12,551,284 B2
(45) Date of Patent: Feb. 17, 2026

(54) IMPLANT DESIGN OPTIMIZATION FOR GEOMETRIC UNCERTAINTY

(71) Applicant: Stryker Australia PTY LTD, Artarmon (AU)

(72) Inventors: Tom Williamson, Brunswick (AU); Ulrich Buehner, Denzlingen (DE); Darpan Shidid, Gungahlin (AU)

(73) Assignee: Stryker Australia PTY LTD, Artarmon (AU)

( * ) Notice: Subject to any disclaimer, the term of this patent is extended or adjusted under 35 U.S.C. 154(b) by 103 days.

(21) Appl. No.: 18/532,566

(22) Filed: Dec. 7, 2023

(65) Prior Publication Data
US 2024/0197402 A1    Jun. 20, 2024

Related U.S. Application Data

(60) Provisional application No. 63/431,175, filed on Dec. 8, 2022.

(51) Int. Cl.
*A61B 34/10*    (2016.01)

(52) U.S. Cl.
CPC ........ *A61B 34/10* (2016.02); *A61B 2034/102* (2016.02); *A61B 2034/108* (2016.02)

(58) Field of Classification Search
CPC ..... A61B 34/10; A61B 2034/102; A61F 2/46; A61F 2002/4633
USPC ..................... 623/17.11–17.16, 19.11–19.14, 623/20.11–20.36
See application file for complete search history.

(56) References Cited

U.S. PATENT DOCUMENTS

| | | | |
|---|---|---|---|
| 2008/0319448 A1* | 12/2008 | Lavallee | G06F 30/00 703/11 |
| 2017/0143494 A1 | 5/2017 | Mahfouz | |
| 2019/0254561 A1* | 8/2019 | Mahfouz | A61B 5/062 |
| 2019/0290361 A1 | 9/2019 | Shalayev et al. | |
| 2020/0197191 A1 | 6/2020 | Akhlaghpour et al. | |
| 2020/0281742 A1 | 9/2020 | Wu et al. | |
| 2020/0305978 A1* | 10/2020 | Tan | A61B 17/1703 |

OTHER PUBLICATIONS

International Search Report including Written Opinion from PCT/IB2023/000762, dated May 23, 2024, pp. 1-13.
A. Danilchenko and J. M. Fitzpatrick, "General approach to error prediction in point registration," Visualization, Image-Guided Procedures, and Modeling Feb. 23, 2010 (vol. 7625, pp. 134-147). SPIE.
C. Krettek et al., "Computer aided tumor resection in the pelvis.," Injury, vol. 35 Suppl 1, p. S-A79-83, Jun. 2004.
(Continued)

*Primary Examiner* — Eduardo C Robert
*Assistant Examiner* — Tara Rose E Carter
(74) *Attorney, Agent, or Firm* — Lerner David LLP

(57) ABSTRACT

Disclosed herein is a method of planning orthopedic surgery. The method can include taking a scan of a patient bone, estimating a potential registration error to occur during the orthopedic surgery, and designing an implant based upon the scan and the potential registration error. The scan can be a three-dimensional scan. The implant can be a patient specific implant. The method can include modifying fixation elements based upon the scan and registration error to avoid impingement and/or disassociation with the bone.

19 Claims, 12 Drawing Sheets

(56) References Cited

OTHER PUBLICATIONS

C. Snyderman, L. A. Zimmer, and A. Kassam, "Sources of registration error with image guidance systems during endoscopic anterior cranial base surgery," Otolaryngol.—Head Neck Surg., vol. 131, No. 3, pp. 145-149, Sep. 2004.
D. Cheong and G. D. Letson, "Computer-assisted navigation and musculoskeletal sarcoma surgery.," Cancer Control, vol. 18, No. 3, pp. 171-176, Jul. 2011.
D. M. Gaillard-Campbell and T. P. Gross, "Optimizing Acetabular Component Bone Ingrowth: The Wedge-Fit Bone Preparation Method," Adv. Orthop., vol. 2019, pp. 1-6, Jul. 2019.
F. He et al., "Effects of resection margins on local recurrence of osteosarcoma in extremity and pelvis: Systematic review and meta-analysis," Int. J. Surg., vol. 36, pp. 283-292, Nov. 2016.
F. Khan, A. Pearle, C. Lightcap, p. J. Boland, and J. H. Healey, "Haptic Robot-assisted Surgery Improves Accuracy of Wide Resection of Bone Tumors: A Pilot Study," Clin. Orthop. Relat. Res., vol. 471, No. 3, pp. 851-859, Mar. 2013.
H. Kienapfel, C. Sprey, A. Wilke, and P. Griss, "Implant fixation by bone ingrowth," J. Arthroplasty, vol. 14, No. 3, pp. 355-368, Apr. 1999.
J. E. Dalton, S. D. Cook, K. A. Thomas, and J. F. Kay, "The effect of operative fit and hydroxyapatite coating on the mechanical and biological response to porous implants," J. Bone Jt. Surg.—Ser. A, vol. 77, No. 1, pp. 97-110, Jan. 1995.
J. G. Gerbers, M. Stevens, J. J. Ploegmakers, S. K. Bulstra, and P. C. Jutte, "Computer-assisted surgery in orthopedic oncology.," Acta Orthop., vol. 85, No. 6, pp. 663-669, Dec. 2014.
J. M. Fitzpatrick, "Fiducial registration error and target registration error are uncorrelated," inMedical Imaging 2009: Visualization, Image-Guided Procedures, and Modeling (Mar. 13, 2009 (vol. 7261, pp. 21-32). SPIE.
J. M. Fitzpatrick, "The role of registration in accurate surgical guidance," Proc. Inst. Mech. Eng. Part H J. Eng. Med., vol. 224, No. 5, pp. 607-622, May 2010.
J. M. Haglin, A. E. M. Eltorai, J. A. Gil, S. E. Marcaccio, J. Botero-Hincapie, and A. H. Daniels, "Patient-Specific Orthopaedic Implants," Orthop. Surg., vol. 8, No. 4, pp. 417-424, Nov. 2016.
K. C. Wong and S. M. Kumta, "Joint-preserving tumor resection and reconstruction using image-guided computer navigation.," Clin. Orthop. Relat. Res., vol. 471, No. 3, pp. 762-773, Mar. 2013.
K. C. Wong, "3D-printed patient-specific applications in orthopedics," Orthop. Res. Rev., vol. 8, pp. 57-66, Oct. 2016.
K. G. Vince, "Why knees fail," J. Arthroplasty, vol. 18, No. 3, pp. 39-44, Apr. 2003.
K.-C. Wong, K.-Y. Sze, I. O.-L. Wong, C.- M. Wong, and S.-M. Kumta, "Patient-specific instrument can achieve same accuracy with less resection time than navigation assistance in periacetabular pelvic tumor surgery: a cadaveric study," Int. J. Comput. Assist. Radiol. Surg., vol. 11, No. 2, pp. 307-316, Feb. 2016.
L. Jeys, G. S. Matharu, R. S. Nandra, and R. J. Grimer, "Can computer navigation-assisted surgery reduce the risk of an intralesional margin and reduce the rate of local recurrence in patients with a tumour of the pelvis or sacrum?," Bone Joint J., vol. 95-B, No. 10, pp. 1417-1424, Oct. 2013.
O. Cartiaux et al., "Surgical inaccuracy of tumor resection and reconstruction within the pelvis: an experimental study.," Acta Orthop., vol. 79, No. 5, pp. 695-702, Oct. 2008.
P. Fürnstahl, L. Vlachopoulos, A. Schweizer, S. F. Fucentese, and P. P. Koch, "Complex Osteotomies of Tibial Plateau Mal-unions Using Computer-Assisted Planning and Patient-Specific Surgical Guides: Preliminary report of three cases," J. Orthop. Trauma, vol. 29, No. 8, pp. e270-e276, Aug. 2015.
P. S. Young, S. W. Bell, and A. Mahendra, "The evolving role of computer-assisted navigation in musculoskeletal oncology," Bone Joint J., vol. 97-B, No. 2, pp. 258-264, Feb. 2015.
R. Balachandran and J. M. Fitzpatrick, "The distribution of registration error of a fiducial marker in rigid-body point-based registration," inMedical Imaging 2008: Visualization, Image-Guided Procedures, and Modeling Mar. 17, 2008 (vol. 6918, pp. 233-244). SPIE.
R. R. Shamir and L. Joskowicz, "Geometrical analysis of registration errors in point-based rigid-body registration using invariants," Med. Image Anal., vol. 15, No. 1, pp. 85-95, Feb. 2011.
S. E. Bosma, K. C. Wong, L. Paul, J. G. Gerbers, and P. C. Jutte, "A Cadaveric Comparative Study on the Surgical Accuracy of Freehand, Computer Navigation, and Patient-Specific Instruments in Joint-Preserving Bone Tumor Resections," Sarcoma, vol. 2018, pp. 1-9, Nov. 2018.
T. E. Bertrand, A. Cruz, O. Binitie, D. Cheong, and G. D. Letson, "Do Surgical Margins Affect Local Recurrence and Survival in Extremity, Nonmetastatic, High-grade Osteosarcoma?," Clin. Orthop. Relat. Res., vol. 474, No. 3, pp. 677-683, Mar. 2016.
T. Otani, L. A. Whiteside, and S. E. White, "Cutting errors in preparation of femoral components in total knee arthroplasty," J. Arthroplasty, vol. 8, No. 5, pp. 503-510, Oct. 1993.
T. Williamson et al., "Population Statistics Approach for Safety Assessment in Robotic Cochlear Implantation," Otol. Neurotol., vol. 38, No. 5, pp. 1-19, Jun. 2017.
Z. Min, H. Ren, and M. Q. H. Meng, "Statistical Model of Total Target Registration Error in Image-Guided Surgery," IEEE Trans. Autom. Sci. Eng., vol. 17, No. 1, pp. 151-165, Jan. 2020.

* cited by examiner

| | | RAPSI | TKA | MICI |
|---|---|---|---|---|
| Error Constraints | SLE Threshold (mm) | 0.5 | 0.5 | 0.25 |
| | Position Error Limits (X/Y/Z mm) | 1 | 1 | Damage to FN/CT |
| | Orientation Error Limits (X/Y/Z°) | 1 | 1 | Damage to FN/CT |
| Simulated Registration Error Distribution | Translation Standard Deviations (X/Y/Z mm) | 0.33 | 0.33 | 0.25 |
| | Rotation Standard Deviations (X/Y/Z°) | 0.33 | 0.33 | 0.25 |
| | Digitized Points | Real | Simulated | Simulated |
| | Rotation Centre | Points Centroid | Points Centroid | Trajectory Start Point |

FIG. 4

IMPLANT DESIGN OPTIMIZATION FOR GEOMETRIC UNCERTAINTY

CROSS REFERENCE TO RELATED APPLICATION

The present application claims the benefit of the filing date of U.S. Provisional Patent Application No. 63/431,175 filed Dec. 8, 2022, the disclosure of which is hereby incorporated herein by reference in its entirety.

FIELD OF INVENTION

The present disclosure relates generally to preoperative planning for orthopedic surgical procedures, including procedures involving patient specific implants and instrumentation.

BACKGROUND OF THE INVENTION

Preoperative planning is becoming more and more prevalent in orthopedic procedures. This includes procedures involving universal implants, patient specific implants and even the use of surgical robots. Typically, the patient will undergo imaging of the surgical site and those images will become the basis for the preoperative plan for a given surgery. This can include determining the location and size of necessary resections, as well as the particular implant(s) to be utilized in the surgery, including in some instances implants that are specifically designed for the given procedure (i.e., patient specific implants).

Patient-to-image registration is a critical step in enabling execution of a preoperative surgical plan. This registration process also represents one of the largest sources of error in image-guided surgery. Failure to accurately register the patient will result in a mismatch between the registered and actual position of the patient anatomy and may have significant consequences for patient outcomes, depending on the specific procedure being performed. In other words, poor registration can and will result in inaccurate and imprecise surgical outcomes.

A range of techniques have been proposed for registering the patient to preoperative image data. The gold standard approach, in terms of accuracy, is the use of bone implanted fiducial screws/markers. These can be precisely detected in both preoperative images and on the patient in the surgical theater and thus allow the position of the patient to be determined with a high level of accuracy and consistency. However, fiducial screws must be implanted prior to imaging. This may mean that the patient needs to undergo an additional operation, or requires the presence of an intra-operative imaging system. Given this, alternative approaches are often utilized, including utilizing registration methods that rely upon surface or anatomical landmarks.

Prior research and other efforts have been aimed at understanding and modelling registration error. The vast majority of this work is aimed at the specific case of estimating target registration error ("TRE") in the case of point-based registration. In these cases, the root-mean-square distance between a number of points with known or unknown correspondences is minimized. A range of works has also been completed towards investigating expected TRE when given a Fiducial Localization Error ("FLE") distribution.

However, there exists a need for improved registration error determination and application of such to both the planning of resections and manufacturing/selection of implants.

BRIEF SUMMARY OF THE INVENTION

The present invention generally addresses issues that arise because of poor registration during a preoperative planning phase. The invention generally estimates the potential errors in registration to, among other things, plan an implant design that is likely to avoid unwanted impingement and/or poor fit.

In accordance with an aspect of the present disclosure, a method of planning an orthopedic surgery is provided. A method according to this aspect, may include the steps of taking a scan of a patient bone, estimating a potential registration error to occur during the orthopedic surgery, and designing an implant based upon the scan and the potential registration error.

Continuing in accordance with this aspect, the scan may be a three-dimensional scan. The implant may be a patient specific implant. The designing step may include modifying fixation elements based upon the scan and registration error impingement and/or disassociation with the bone. The fixation elements may be flanges.

Continuing in accordance with this aspect, the method may further include a step of implanting the implant on the bone. The method may further include a step of identifying a volume to be resected. The volume may include a tumor.

Continuing in accordance with this aspect, the method may further comprise a step of generating a visual representation of the bone based upon the scan and registration error. The visualization representation may be a color map.

Continuing in accordance with this aspect, the designing step may include modifying an existing implant design.

In accordance with another aspect of the present disclosure, a method of planning an orthopedic surgery is provided. A method according to this aspect, may include the steps of estimating a potential registration error to occur during the orthopedic surgery, designing an implant based on data representing a patient bone and the potential registration error, and implanting the implant on the bone.

Continuing in accordance with this aspect, the data representing the patient bone may be a three-dimensional scan.

Continuing in accordance with this aspect, the implant may be a patient specific implant. The designing step may include modifying fixation elements based upon the scan and registration error to avoid impingement and/or disassociation with the bone. The fixation elements may be flanges. The surgery may include a tumor removal.

Continuing in accordance with this aspect, the method may include a step of identifying a volume to be resected.

Continuing in accordance with this aspect, the step of generating a visual representation of the bone based upon the data representing the patient bone and registration error.

BRIEF DESCRIPTION OF THE DRAWINGS

A more complete appreciation of the subject matter of the present disclosure and the various advantages thereof can be realized by reference to the following detailed description, in which reference is made to the following accompanying drawings:

FIG. 4 is a table with critical parameters for a simulation case.

DETAILED DESCRIPTION

Figure 1:
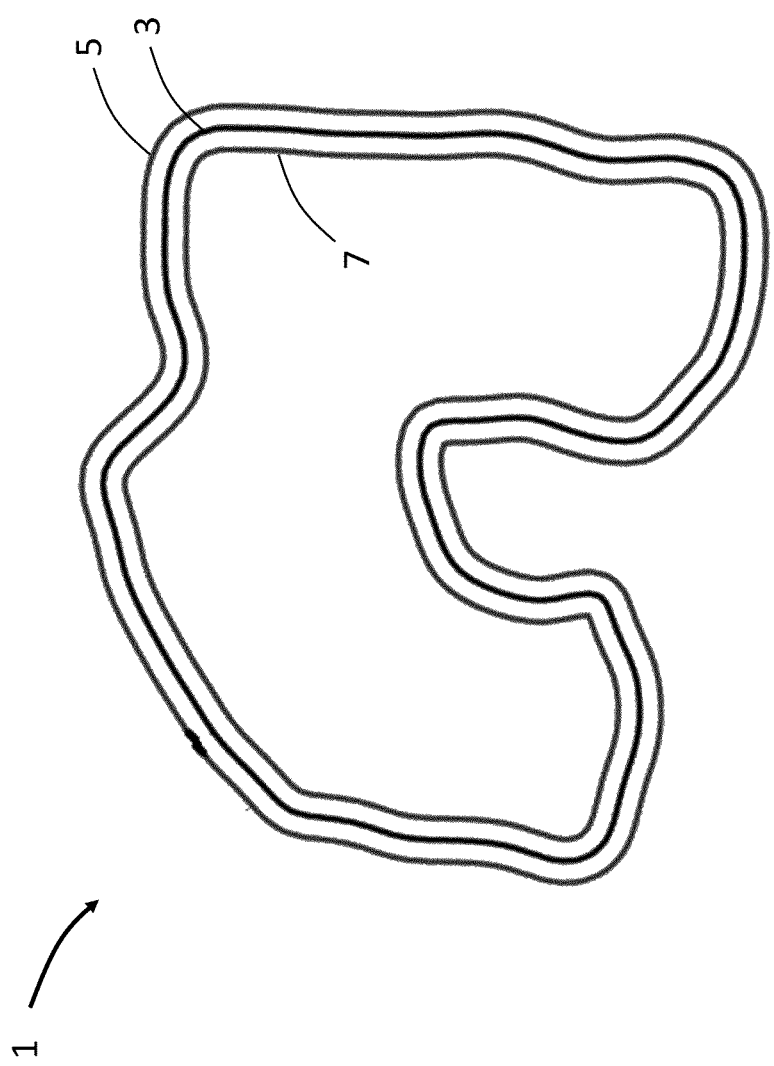
FIG. 1 is a view depicting digitized surfaces of a femur.

Reference will now be made in detail to the various embodiments of the present disclosure illustrated in the accompanying drawings. The term "a," as used in the specification, means "at least one." Moreover, in describing preferred embodiments of the disclosure, reference will be made to directional nomenclature used in describing the human body. It is noted that this nomenclature is used only for convenience and that it is not intended to be limiting with respect to the scope of the present disclosure. As used herein, when referring to bones or other parts of the body, the term "anterior" means toward the front part of the body or the face, and the term "posterior" means toward the back of the body. The term "medial" means toward the midline of the body, and the term "lateral" means away from the midline of the body. The term "superior" means closer to the head, and the term "inferior" means more distant from the head.

Existing registration error modelling approaches require an estimate of FLE, which represents the accuracy with which a specific point can be localized in both image and patient spaces. This FLE is made up of the combination of a number of sub-errors including tracking accuracy and noise/jitter, tool calibration errors, as well as user error (how accurately can the same point be detected in both image and patient spaces). The present invention focuses on an equivalent error, the surface localization error ("SLE"), that describes how accurately any point on the surface of the bone can be localized. The SLE is made up of similar error sources that give the FLE but with the segmentation error (error when reconstructing a surface from image data) replacing image point localization error, and user point localization error instead referring only to the ability of the user to place a registration tool at any point on the bone. One can consider that the SLE is applied only normal to the bone surface at any given point on the bone.

In the past, FLE has been modelled only as zero-mean isotropic or anisotropic Gaussian noise. However, this does not capture the complexity of the real-world situation. For a specific surgical case, tool calibration errors (for example due to bending of the tool tip, shifting of tracking markers or general miscalibration) will be of constant magnitude, with a direction defined by the current tool orientation. Segmentation errors may be zero mean when considered across a whole bone or across various cases but are more likely to be correlated within the local area in which digitization is performed (and there may be systematic over- or under-segmentation across the whole bone). User surface localization errors are also likely to be locally correlated: some areas are more difficult to reach than others or the surgeon may have failed to adequately clear soft tissue or periosteum from the surface of the bone, in both cases errors in surface localization would be expected to increase. Other errors, such as tracking jitter, can be reasonably approximated using zero mean noise in which taking multiple measurements will move the position estimate towards the real value.

Thus, although one can estimate the SLE (or FLE) one cannot be sure exactly where in the estimated SLE range the acquired measurements fall or assume that their average will be zero. In accordance with the present invention, the SLE is treated instead as a threshold—i.e., if a point is digitized on the surface, the real surface will be within the defined threshold of the digitized point, with no further assumptions being made about where in that range it actually is. For example, with an SLE threshold of 0.5 mm, a point that is 0.1 mm from the surface does not give any more information or represent a better result than a point 0.2 mm from the bone surface as both are within the expected range of error. Making this concession allows investigation into potential situations where systematic errors have occurred (within some expected range) when extended to the complete set of digitized points. The concept is shown visually in FIG. 1 in connection with a femur 1, where surface 3 points represents the digitized surface and threshold surfaces 5 and 7 represent the plus/minus threshold surfaces, respectively.

This assumption has additional implications for registration validation, commonly done by touching various points on the surface of the bone after registration and examining if they are within some desired threshold. Simply put, if a probe placed on the surface of the bone returns a distance from the bone outside the SLE threshold, one cannot tell if this error is due to registration error or inherent localization error. If the distance returned is outside the SLE threshold, the excess error can be assumed to be due to a registration mismatch and appropriate steps taken (e.g., acquire additional points, re-initialize and re-run the algorithm, etc.). With these assumptions in mind the effect of registration errors on the bone can be simulated.

Figure 2:
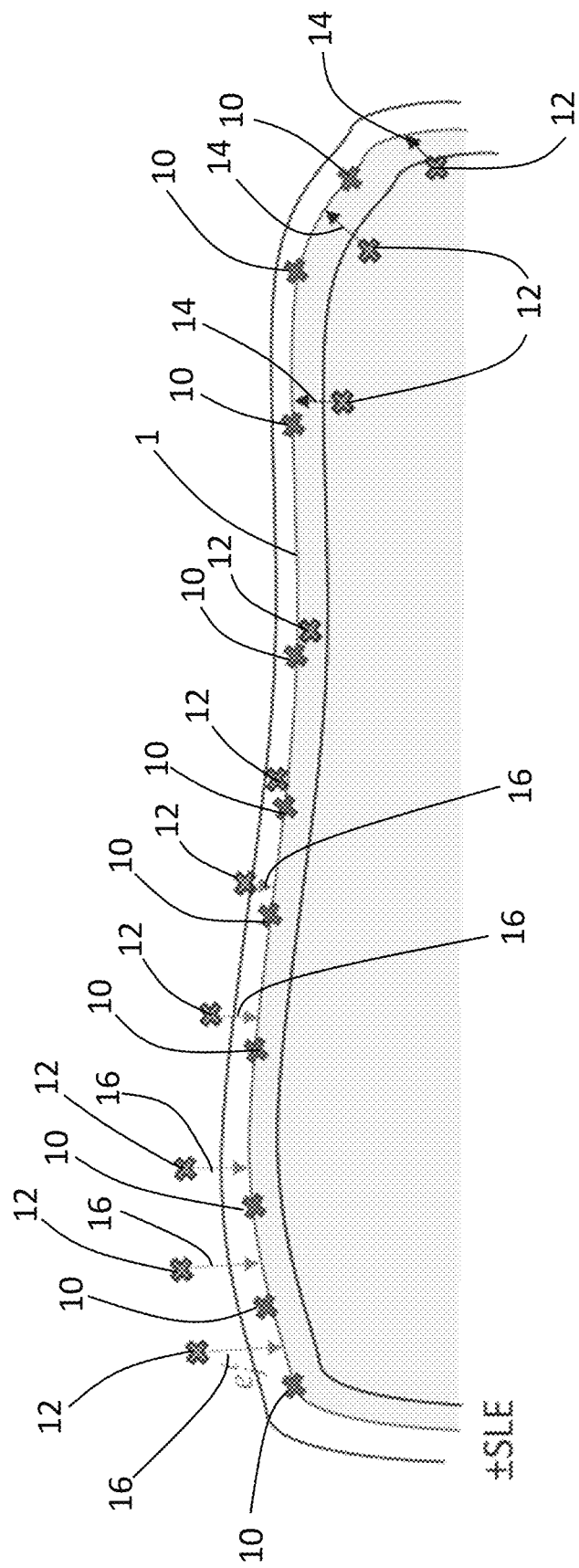
FIG. 2 is another view of the digitized femur of FIG. 1 with individual digitized points shown.

It is possible to examine how each vertex of the segmented bone mesh (surface representation) moves under the application of specific registration errors and, specifically, how far each vertex (point on the surface) shifts from the original segmented surface of the bone as shown in FIG. 2 in which points 10 are on the surface of femur 1, points 12 are located above the surface of femur 1 and points 14 are located below the surface of femur 1. Arrows 16 depict the distance from points 12 to the surface of femur 1 (above the femur), while arrows 18 depict the distance from points 14 to the surface of femur 1 (impinging the femur). Based on a randomly generated but restricted set of transformation errors, it is possible to evaluate the magnitude of the expected shift of a point from the original surface of femur 1.

Each time the patient is registered the computed transformation will vary slightly, depending on the registration method used and expected distribution of errors. In accordance with the present invention, a Monte-Carlo approach that is agnostic to the registration approach is utilized, but requires an initial estimate of the registration error distribution. In this approach the error is assumed to be normally distributed with zero mean and independent in each direction; the distribution is provided as the standard deviation of the translational error in each direction and of the rotational error around each axis. Based on this distribution one can then generate example registration transformations by drawing a random value from each of the independent translation and rotation distributions and applying a translation or rotation of this magnitude in/around the relevant axis. The translation can be described mathematically as:

$$t=[t_x,t_y,t_z] t_x \sim N(0,\sigma_{tx}^2)$$

$$t_y \sim N(0,\sigma_{ty}^2)$$

$$t_z \sim N(0,\sigma_{tz}^2)$$

In which t is the total error translation and $t_*$ is the error in a particular direction drawn from a normal distribution with zero mean and variance $\sigma_{t*}^2$. The rotation can be described mathematically as:

$$R=R_z(r_z) \times R_y(r_y) \times R_x(r_x) r_x \sim N(0,\sigma_{rx}^2)$$

$$r_y \sim N(0,\sigma_{ry}^2)$$

$$r_z \sim N(0,\sigma_{rz}^2)$$

In which R is the total rotational error $R_*(r_*)$ is the rotation matrix around the relevant axis, and $r_*$ is the error rotation angle drawn from a normal distribution with zero mean and variance $\sigma_{r*}^2$.

For each simulated registration, certain of the vertices do not shift by far enough to overcome the defined SLE threshold. Based on the assumptions described above, these vertices do not contribute to constraining this specific registration error. They also cannot be used to verify if this error has occurred, as it is not possible to tell if the observed distance from the surface is due to localization or registration error. However, vertices that do shift by more than the SLE threshold do constrain that error and can be used for verification. If that particular position on the bone is digitized and the observed distance to the bone is within the threshold it can be assumed that this error has not occurred (as if it had, the digitized point would be outside the threshold). By repeating this for a large number of registration error scenarios it can be determined which areas of the bone contribute to detection in the most simulated cases. These areas should be the focus of the registration point acquisition. It is also possible determine what type of errors each area can detect. Conversely, the SLE threshold required to detect a specific registration error given a set of digitized points can be determined.

If a set of digitized points are provided, these errors can be applied directly to those points and their shift from the surface examined in the same way as described above. This allows the direct evaluation of a specific registration point distribution either pre- or intra-operatively.

Figure 3A:
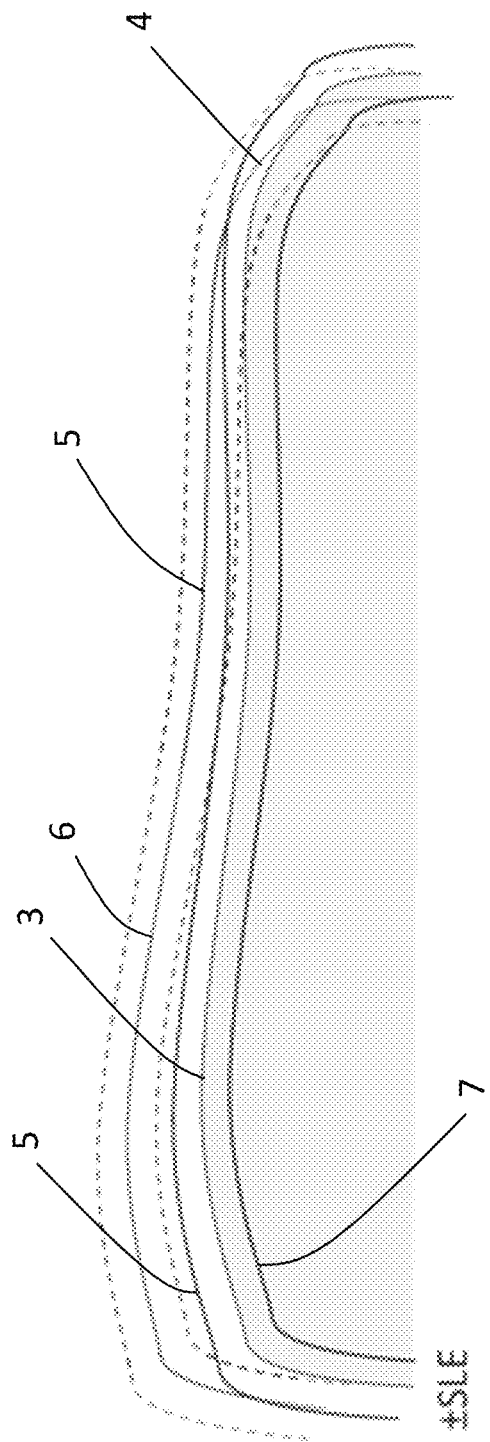
FIG. 3A is yet another view of the digitized femur of FIG. 1 with additional registration error surfaces shown.

Digitized points that shift by below the threshold do not contribute to detection, those that move more than the threshold do. However, the same SLE threshold applies to points digitized on the shifted surface as that applied to the unshifted surface, as shown in FIG. 3A. There, surfaces 3, 5 and 7 are again shown in connection with surfaces under some applied registration error (labeled with reference numerals 4, 6 and 8). As shown, portions of these error surfaces that are well outside of the threshold surfaces 5 and 7 are detectable, while other portions are close enough to or within the threshold surfaces are undetectable. Line region 4 is undetectable as this regions lies within the SLE threshold. Line region 5 is possibly detectable as this region lies just outside the SLE threshold. Line region 6 is clearly detectable as this region lies well outside the SLE threshold.

Figure 3B:
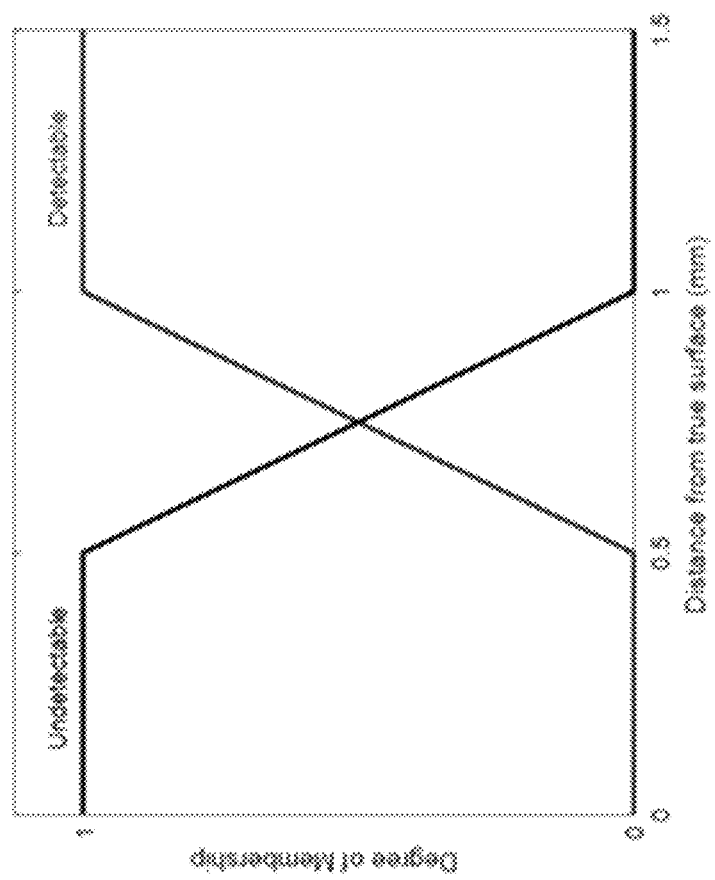
FIG. 3B is a membership function plot for one vertex on a bone surface.

For instance, FIG. 3B shows a membership function plot for one vertex on the bone surface with an SLE threshold of 0.5 mm. As shown, between 0.5 mm and 1 mm it is unclear, but increasingly likely, that the point can be used to detect the given registration error. Therefore, for the shift of a point to be clearly detectable it must actually move by double the threshold. Between these values it is still unclear if the shift in the position is due to the registration error or expected SLE. Again, the membership function shown in FIG. 3B depicts that the further a point moves above the threshold the more likely it is to contribute to detection of the registration error.

In order to detect a specific registration error, at least one clearly detectable point must be digitized. Alternatively, a "weight of evidence" approach can also be taken, whereby multiple points that fall within the fuzzy region provide some evidence that detection is possible and can be combined. Thus, an error can be detected if the sum of the distances for points above the threshold is greater than the threshold. For example, a scenario with one point that moves by 1 mm from the surface with an SLE threshold of 0.5 mm is defined as a detectable error, as is a scenario with five points that move 0.6 mm from the surface. This is described mathematically below:

$$\sum_{i=0}^{n} d_i [d_i > 0] > \tau_{SLE}$$

In which n is the number of points in the registration point set, $d_i$ is the distance point i has moved from the surface, minus the SLE threshold (i.e., $d_i = e_i - \tau_{SLE}$ where $e_i$ is the actual distance the point has moved) and $\tau_{SLE}$ is the SLE threshold value.

Finally, a registration quality metric based on the percentage of simulated cases that the specific point distribution can detect is as follows:

$$q = \left(1 - \frac{n_{detectable}}{n_{total}}\right) \times 100$$

In which q is the registration quality, $n_{detectable}$ is the number of scenarios with errors that can be detected with the given point distribution as described in the previous section and $n_{total}$ is the total number of generated error scenarios. In cases with multiple error components (e.g., individual rotations and translations) this can also be extended to assess how good the point distribution is at detecting specific error types (e.g., a rotation error above the threshold around the z axis):

$$q_{rx} = \left(1 - \frac{n_{detectable(rx)}}{n_{rx}}\right) \times 100$$

In which $q_{rx}$ is the quality metric for a rotation registration error around the x axis.

The above analysis is based on the identification of which vertices of the reference mesh allow the detection of each simulated registration error. This can be extended to identify which vertices would be most useful to digitize next. The simulation process will result in a total of n errors that cannot be detected with the current point distribution ($n_{undetect}$). For each of these undetectable errors the query point set is set as the complete set of vertices in the reference mesh and compute their shift from the original surface. The number of cases in which this vertex moves above the threshold in the currently undetectable error scenarios can be determined as follows:

$$r_i = \frac{\sum_{j=0}^{n_{undetect}} e_i^j > \tau_{SLE} ? 1.0 : 0.0}{n_{undetect}} \times 100$$

In which $r_i$ is the recommendation factor for vertex i in the reference mesh, $e_i^j$ is the distance that vertex i moves under application of undetectable error j. This information can then be displayed as a colormap to guide the user in terms of the most useful points to digitize next.

When utilizing an image-guided robotic system, the final achievable system accuracy is to a large extent defined by the accuracy with which the patient can be registered to the pre-operative plan. The required level of system accuracy will vary depending on the specific application, and potentially on the specific anatomy of the patient. Examples include required positioning and orientation errors for orthopaedic implants (for example a position error of less than 1 mm in each of the primary axes of the limb, and less than 1° rotation around those axes) or drilling of a trajectory such that some critical anatomy is not damaged (as in the case of robotic cochlear implantation).

The present invention has been considered and is useful in at least three scenarios: robotic assisted cutting and placement of a patient specific implant (RAPSI), total knee arthroplasty (TKA) and minimally invasive cochlear implantation (MICI). The key parameters in each of these scenarios is defined in the table included as FIG. 4.

Figure 5A:
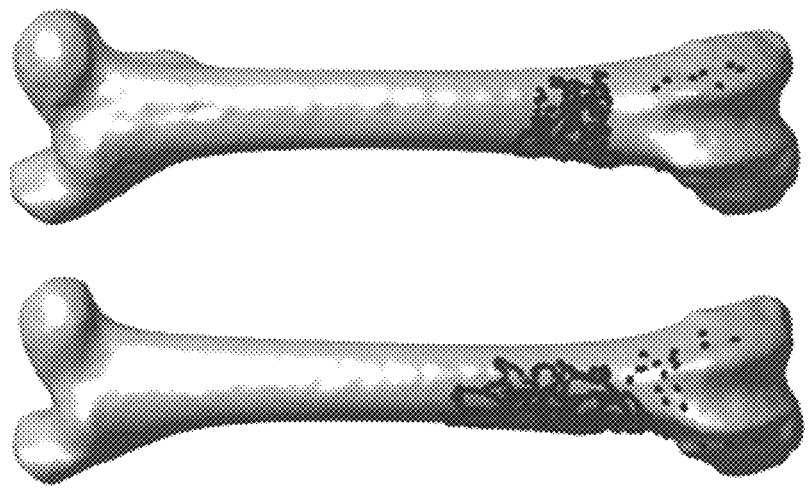
FIG. 5A is a point distribution for a robotic assisted cutting and placement of a patient specific implant.
Figure 5B:
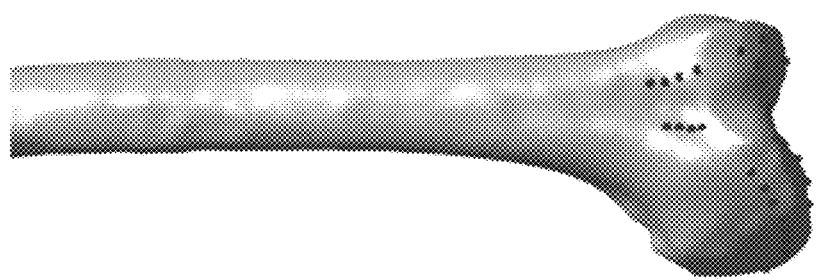
FIG. 5B is a point distribution for a total knee arthroplasty.
Figure 5C:
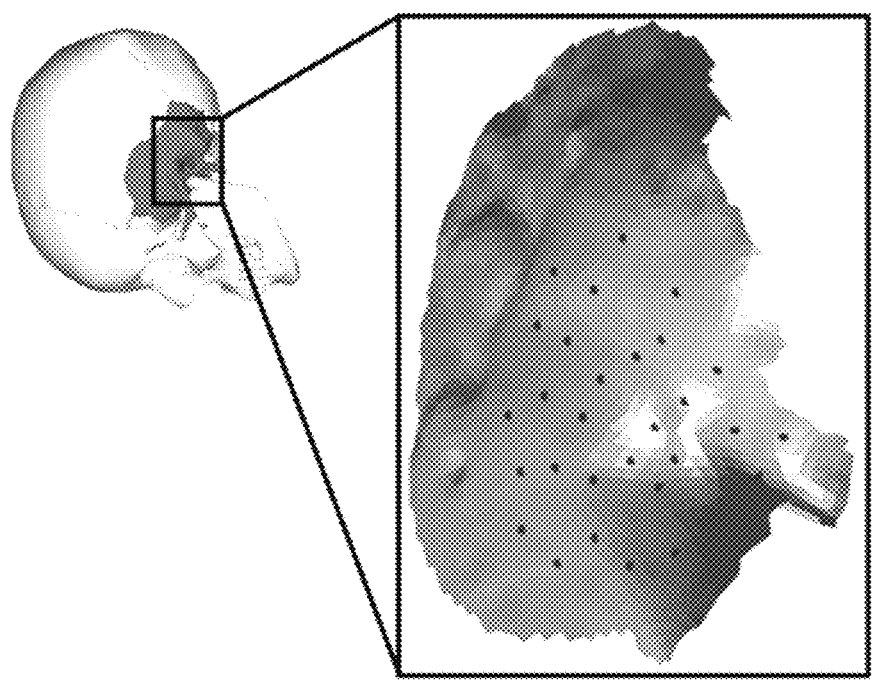
FIG. 5C is a point distribution for a minimally invasive cochlear implantation.

For each generated error scenario, it is to be determined whether the provided digitized point pattern would allow the detection of that error. When computing this for an intra-operatively generated point distribution one must first compute the registration matrix using ICP (or whatever selected registration method) and the closest points on the pre-operative bone model to the intra-operatively digitized points after registration. These model points are used as the input for point distribution and simulation. It is possible at this stage that some of these points will fall outside of the SLE threshold. These are to be considered as outliers (due to user error or noise) and are discarded for the purposes of the quality computation. In the registration workflow it would be recommended that these points be re-registered or used as verification points as described below. For simulated point distributions the point distribution as selected on the bone model is used without further modification. Examples of the point distributions used for evaluation are shown in FIGS. 5A-C.

These point distributions can be presented in other manners, such as in heatmap form. Presenting the simulated distributions in this fashion can allow a surgeon, implant manufacturer or other person to better evaluate the distribution and potential shortcomings with same. Ultimately, the surgeon or other medical professional can use the output to determine the need for further registration of additional points or the re-registration of others. The surgeon can also very easily identify the areas of bone in which registration error has a large effect, as well as the overall impact of the error on the ultimately placement of an implant. Thus, the heatmap illustrates the quality of the current point distribution—i.e., shown numerically as a percentage of relevant metrics. The heatmap provides guidance to the surgeon for selecting points to acquire a good distribution for registration. For example, selecting additional points, initial point selection, etc. The heatmap can guide the surgeon to avoid certain areas when designing implants. For example, areas with high variability are more likely to cause impingement with even small registration errors. The surgeon can use the heatmap to offset the implant flange based on the expected error in these regions to minimize the likelihood of impingement.

The present invention will now be described in the context of a bone tumor surgery involving the use of robotic technology. It is to be understood that the present invention has applicability to other surgical procedures, including general joint replacement surgeries. However, registration error has a large impact on bone tumor surgery and thus the present invention will be discussed in connection with same. Moreover, while the following is discussed in connection with the design and use of patient specific implants, it is to be understood the that the present invention has applicability in connection with the design and use of universal implants that are not patient specific.

Robots are capable of highly precise removal of bone, accurately following even highly complex pre-operatively planned paths. The overall accuracy of a robotic system is the result of the interaction of several individual components and systems, each with their own set of error sources and distributions. Minimizing the errors observed at each stage of the procedure and within subsystems is critical to achieving acceptable overall accuracy.

Figure 6:
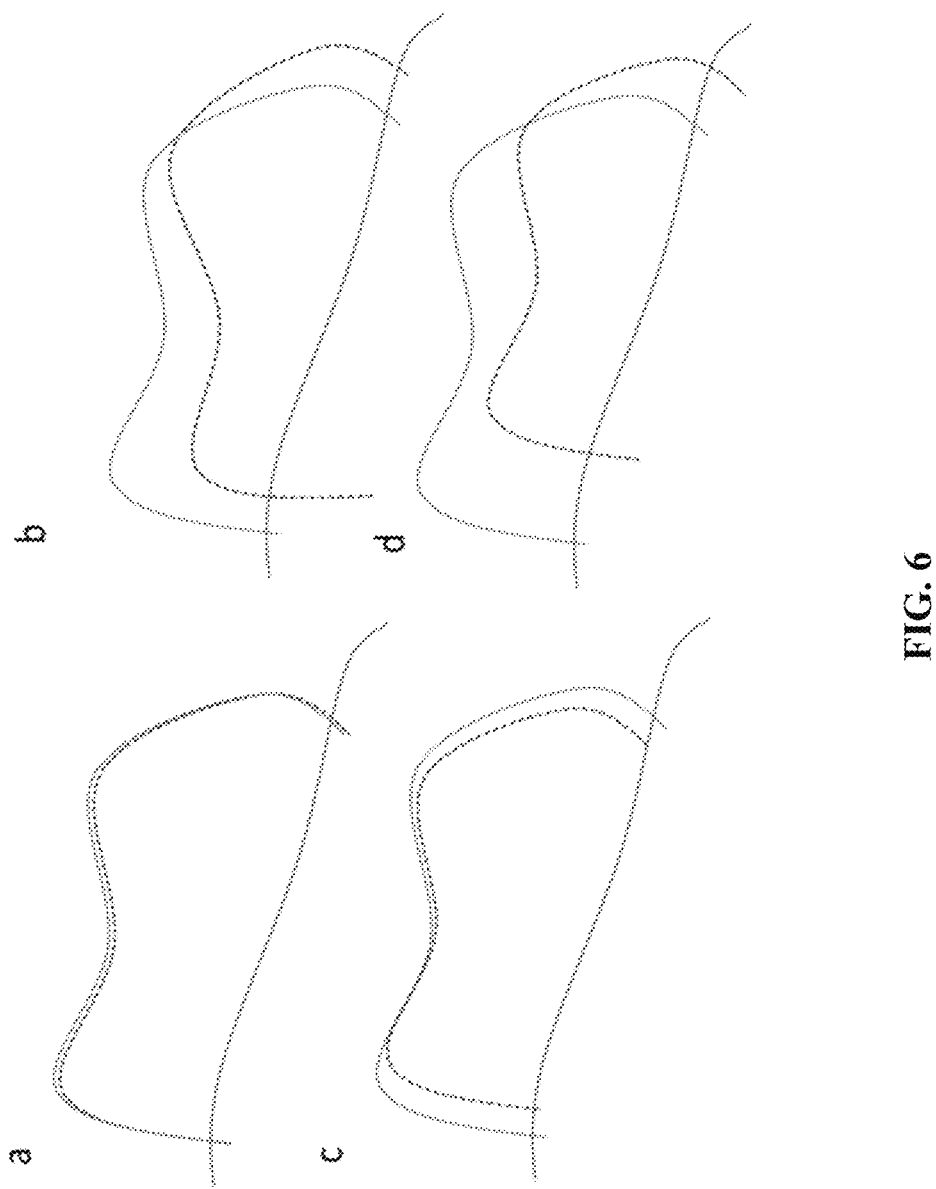
FIGS. 6a-d depict different outcomes based upon cut accuracy and/or precision.

In the case of robotic assisted osteotomy for patient specific implants, one can differentiate between the overall system accuracy and precision. As used herein, cut precision is a measure of how well the shape of the removed volume matches the planned shape of the volume. Cut accuracy refers to how well the overall position of the removed volume matches the pre-operative plan. Depending on the specific characteristics of the robotic system it is possible to achieve high accuracy with low precision (cuts are in the correct overall location, but shape is incorrect), low accuracy with high precision (shape is correct but position of shape is incorrect relative to plan), high precision and high accuracy (the target scenario) or low precision and accuracy. These concepts are explained visually in FIGS. 6a-d. In particular, FIG. 6a depicts cuts that are both accurate and precise, FIG. 6b depicts cuts that are precise but not accurate, FIG. 6c depicts cuts that are accurate but not precise and FIG. 6d depicts cuts that are neither accurate nor precise.

Robots can generally achieve high precision, however high accuracy is far more difficult to guarantee. Cut accuracy depends to a large extent on the accuracy of the patient-to-image registration process, which depends on factors such as user skill and experience, the availability of unique surface or registration features (or the use of fiducials), algorithm initialization, tracking accuracy and tool calibration. As discussed above, in practice there is always some amount of registration error present, and it is very difficult to independently quantify the accuracy of the registration. The use of the above-discussed registration error simulation can, however, be utilized in connection with robotic procedures and the use of patient specific implants.

The primary aim of a patient specific implant is to restore function by replacing removed bone. Many orthopaedic implants include structured or random lattices at the bone-implant interface surface, allowing bone to grow into the implant, improving long-term fixation. This process requires close contact between the implant's interface surface and remaining bone to allow bone bridging and subsequent ingrowth. Bone in-growth has been associated with significant reductions in implant failure and revision rates in uncemented implants. The precision with which cuts are made and the subsequent shape of the void is critical. As high precision is achievable using robotics, the present invention is useful in addressing the variable accuracy scenario outlined above.

Errors in void position and orientation can have a number of wider clinical consequences, including failure to remove all required diseased tissue or damage to surrounding critical vascular or neural structures. These factors can be managed through the application of sufficient margins (based on the system accuracy) or other changes in pre-surgical plan and/or implant design to minimize risk to the patient. However even errors within the expected range of the characterized system accuracy can have a significant effect on implant fit and bone ingrowth.

The initial (primary) fixation of the implant to the bone during surgery is critical in ensuring the stability of the implant, particularly during the early stages of bone healing. Depending on the location and geometry of the implant, primary fixation can be achieved by direct screw fixation, integrated flanges, stems, nails, or additional plates. The procedure discussed below is applicable to any patient specific device with some form of integrated fixation, whether stem, nail or direct screw holes, but the focus herein will be on the use of integrated flanges. Flanges allow efficient transfer of forces through the implant body and allow fixation load to be spread across a large area, as well as ensuring close contact of the implant to bone interface in a similar manner to existing trauma plates. It is possible to design these features such that they conform closely to the surface morphology of the patient's bone.

Figure 7:
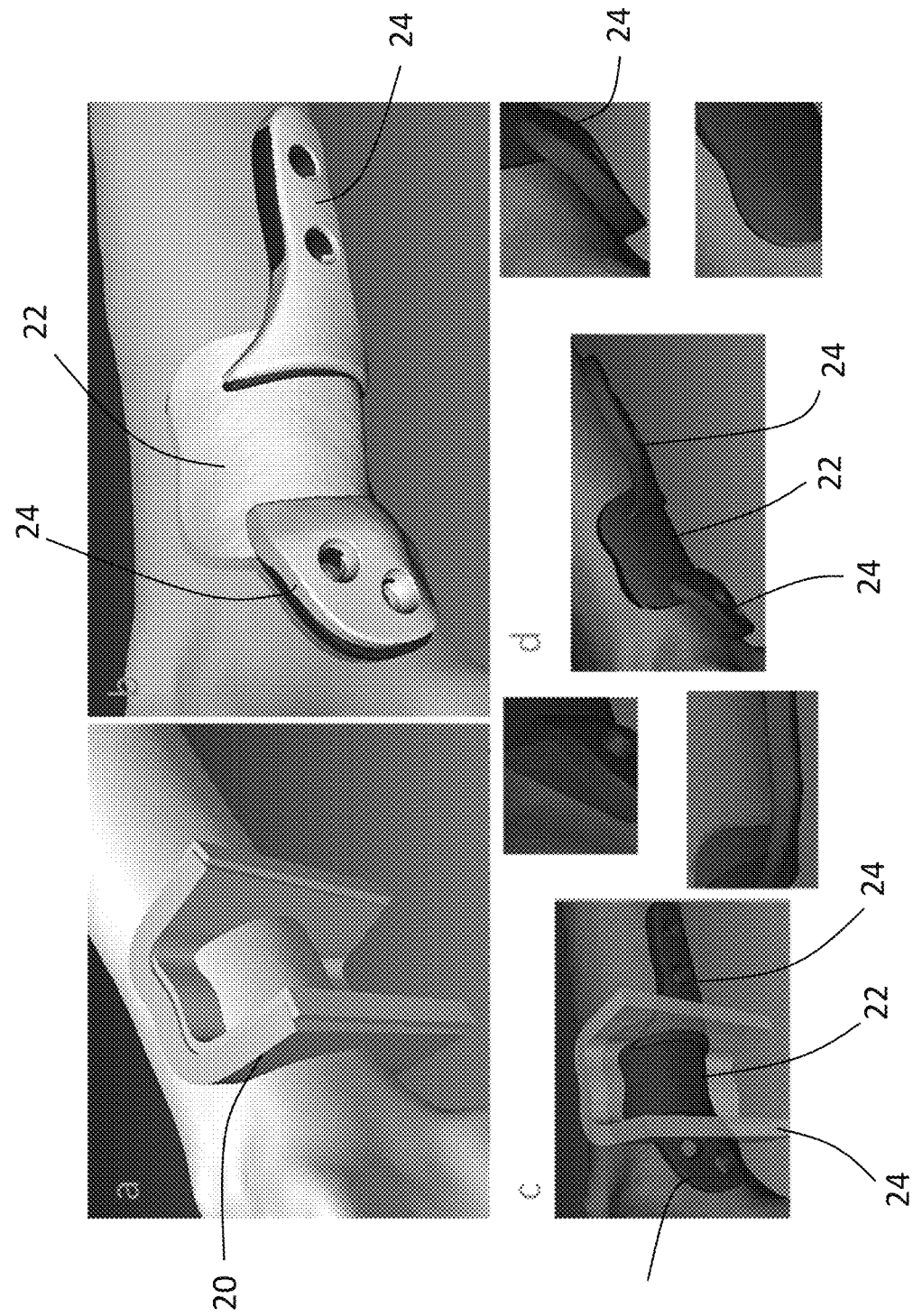
FIGS. 7a-d depict different aspects of a bone tumor removal surgery.

The practical effect of registration error is a mismatch between where the robotic system has identified the target bone as being located and the bone's real position and orientation in space. An example of the effect of this is shown in FIGS. 7a-d, in which a bone tumor is removed and replaced with an implant. FIG. 7a depicts a cut area 20 that suffers from registration errors that results in a translation and rotation of the cut. FIG. 7b depicts the positioning of an implant 22 that is positioned in accordance with the translated and rotated cut. FIG. 7c depicts the magnitude of the error that may result in impingement of fixation features, such as flanges 24. This can result in the gaps depicted in FIG. 7d between the implant ingrowth interface and cut bone surface, which can impact bone-implant construct strength. Thus, during the implant design process, it would be beneficial to understand how likely the misalignment depicted in these figures is to happen, what factors influence this effect and potentially modify the implant design to improve upon the bone/implant contact.

While the above-discussion focuses on simulating the effects of registration error at various positions on the bone, utilizing that simulation in the context of the creation of patient specific implants focuses on how a landmark moves relative to the surface of the bone around it. If a particular registration error causes a landmark on the bottom surface of the fixation flange to shift in some way that it remains on or above the surface of the bone, this error does not cause impingement as shown in FIG. 2.

Figure 8A:
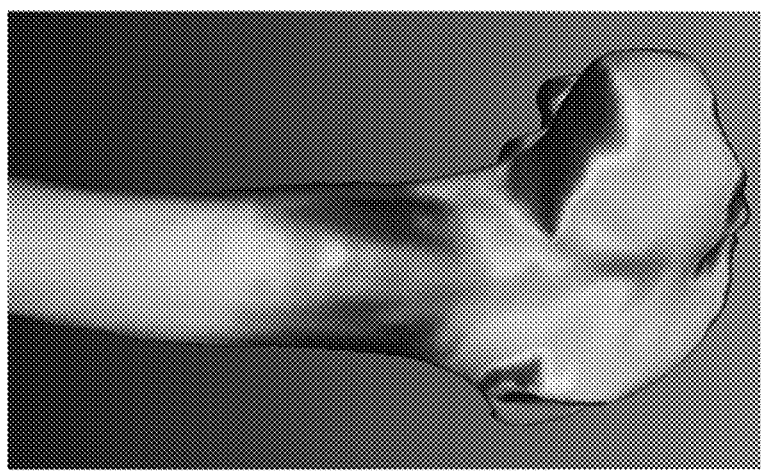
FIG. 8A depicts a color map and representation of registration error.
Figure 8B:
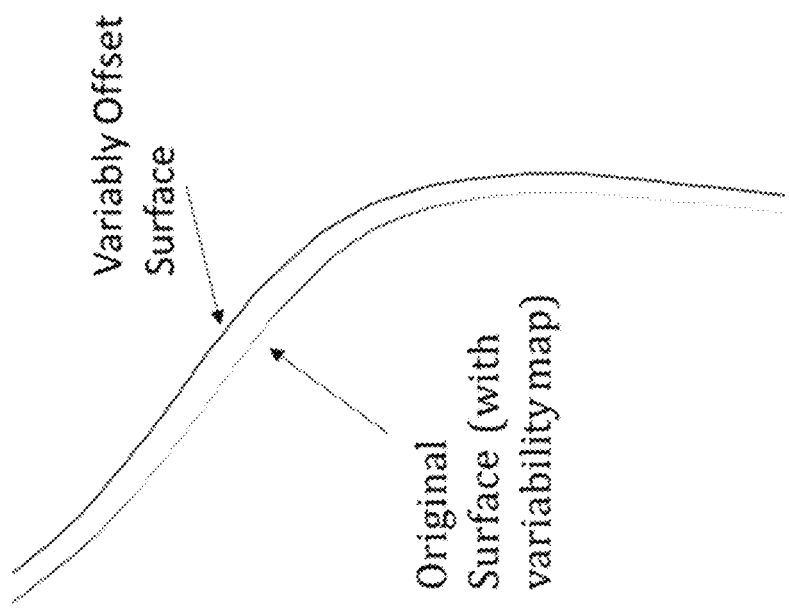
FIG. 8B is a representation of offsets from an original surface to a variably offset surface.

Again, landmark variation information can be shown to the user by coloring each of the landmarks according to the distance from each landmark to the original surface. An example of this is shown in the color map of FIG. 8A, which shows the user the expected effect of registration error over the bone at the specified landmarks, visualizing regions in which registration errors have a small (low mean variation) or large (high mean variation) overall effect. This information can be used to identify areas that potentially should be avoided when designing fixation features such as flanges.

In addition to providing direct feedback about areas to avoid when designing flanges, surface variation information can be used to actively modify the design to avoid impingement. One method to avoid collision of the flange and bone is to offset the flange by some distance. This offset distance should be minimized where possible: a large gap between the bone and bottom of the flange may have unexpected effects on biomechanics, lead to catching of surrounding soft tissue or potentially lead to increased infection risk. Increased thickness protruding from bone surface might be palpable, which may be problematic in the event of only thin, soft-tissue coverage.

Surface variation information can be utilized to define a variable offset across the flange, based on the size of registration error effects at that location. Areas in which registration errors lead to minimal change in surface position can be offset less than those in which the effects of registration error are large. This process is shown in 8B.

In addition to providing information during the initial implant design process, a similar approach can be used to evaluate a specific implant design in terms of the probability of impingement. To determine impingement likelihood, the vertices of the implant mesh are set as the landmarks for evaluation. The same Monte-Carlo registration error modelling approach described above is applied to the implant, and the total number of iterations in which each landmark impinges (i.e., sits underneath the bone) counted. This process is described mathematically below.

$$p_j = \frac{\sum_{i=1}^{n}(d_j^i \leq \tau)}{n} \times 100$$

In which $p_j$ is the likelihood of impingement for landmark j on the surface of the implant, $d_j^i$ is the distance from the landmark j to the surface for error transformation j of n total error simulations and $r$ is a threshold defining at what distance a landmark is considered to be impinging. This method provides an independent approach for comparing multiple implant designs with respect to the expected registration error distribution.

Although the invention disclosed herein has been described with reference to particular features, it is to be understood that these features are merely illustrative of the principles and applications of the present invention. It is therefore to be understood that numerous modifications, including changes in the sizes of the various features described herein, may be made to the illustrative embodiments and that other arrangements may be devised without departing from the spirit and scope of the present invention. In this regard, the present invention encompasses numerous additional features in addition to those specific features set forth herein. Moreover, the foregoing disclosure should be taken by way of illustration rather than by way of limitation as the present invention is defined in the examples of the numbered paragraphs, which describe features in accordance with various embodiments of the invention, set forth in the paragraphs below.

The invention claimed is:

1. A method of planning an orthopedic surgery, the method comprising the steps of:
taking a scan of a patient bone;
estimating a potential registration error to occur during the orthopedic surgery using a simulation model applying a surface localization error threshold, the simulation model computing likelihoods of displacement of vertices of a segmented bone surface beyond the surface localization error threshold; and designing an implant based upon the scan, the potential registration error, and the computed likelihoods.

2. The method of claim 1, wherein the scan is a three-dimensional scan.

3. The method of claim 1, wherein the implant is a patient specific implant.

4. The method of claim 3, wherein the designing step includes modifying fixation elements based upon the scan and registration error to avoid impingement and/or disassociation with the bone, wherein modifying the fixation elements includes variably offsetting portions of the fixation elements relative to the bone surface in accordance with a location-specific magnitude of registration error effects determined by the simulation model such that areas of high error magnitude receive increased offset to reduce impingement risk.

5. The method of claim 4, wherein the fixation elements are flanges.

6. The method of claim 5, wherein the surgery is a tumor removal surgery.

7. The method of claim 1, wherein the fixation elements is a flanges.

8. The method of claim 7, wherein the surgery includes a tumor removal.

9. The method of claim 1, further comprising the step of implanting the implant on the bone.

10. The method of claim 1, further comprising the step of identifying a volume to be resected.

11. The method of claim 10, wherein the volume includes a tumor.

12. The method of claim 1, further comprising the step of generating a visual representation of the bone based upon the scan and registration error.

13. The method of claim 12, wherein the visual representation is a color map encoding a probability distribution of registration error detection across the bone surface derived from the simulation model, the color map configured to guide surgical point acquisition or implant feature placement.

14. The method of claim 1, wherein the designing step includes modifying an existing implant design.

15. A method of planning an orthopedic surgery, the method comprising the steps of:

estimating a potential registration error to occur during the orthopedic surgery using a simulation model applying a surface localization error threshold, the simulation model computing likelihoods of displacement of vertices of a segmented bone surface beyond the surface localization error threshold;

designing an implant based on data representing a patient bone, the potential registration error, and the computed likelihoods, adapting at least one fixation element to avoid impingement or disassociation with the patient bone based on the computed likelihoods, and implanting the implant on the bone.

16. The method of claim 15, wherein the data representing the patient bone is a three-dimensional scan.

17. The method of claim 15, wherein the implant is a patient specific implant.

18. The method of claim 15, further comprising the step of identifying a volume to be resected.

19. The method of claim 15, further comprising the step of generating a visual representation of the bone based upon the data representing the patient bone and registration error.

* * * * *